United States Patent [19]
Gingrich

[11] Patent Number: 5,816,711
[45] Date of Patent: Oct. 6, 1998

[54] PACKAGE BEARING WITH RETAINER

[75] Inventor: John R. Gingrich, Farmington, Mich.

[73] Assignee: The Timken Company, Canton, Ohio

[21] Appl. No.: 939,105

[22] Filed: Sep. 26, 1997

[51] Int. Cl.⁶ .............................. F16C 33/80; F16C 41/04
[52] U.S. Cl. ......................... 384/488; 384/448; 384/489; 384/589
[58] Field of Search .................... 384/477, 480, 384/488, 489, 448, 589

[56] References Cited

U.S. PATENT DOCUMENTS

| | | | |
|---|---|---|---|
| 2,114,954 | 4/1938 | Brodin | 384/488 |
| 3,276,826 | 10/1966 | Draudt | 384/482 |
| 3,350,148 | 10/1967 | Sanguinetti et al. | 384/488 |
| 3,700,296 | 10/1972 | Bugmann | 384/484 |
| 4,010,986 | 3/1977 | Otto | 384/478 |
| 4,054,335 | 10/1977 | Timmer | 384/489 X |
| 4,372,628 | 2/1983 | Kiener et al. | 384/476 |
| 4,402,558 | 9/1983 | Olschewski et al. | 384/469 |
| 4,655,617 | 4/1987 | Yasui et al. | 384/488 X |
| 5,022,659 | 6/1991 | Otto | 277/1 |
| 5,085,519 | 2/1992 | Dougherty | 384/448 |
| 5,380,103 | 1/1995 | Lederman | 384/489 |

*Primary Examiner*—Thomas R. Hannon
*Attorney, Agent, or Firm*—Polster, Lieder, Woodruff & Lucchesi, L.C.

[57] ABSTRACT

A package bearing includes two cones that fit over a spindle on a wheel hub, a double cup that surrounds the cones and is configured to bolt against the suspension system of a vehicle, and tapered rollers that are located between opposed raceways on the cup and the two cones. The cup at each of its ends has an end bore. The end bore at the outboard end contains a seal which establishes a dynamic fluid barrier with the outboard cone. The end bore at the inboard end contains a flexible retainer that creates a closure between the cup and the inboard cone. The end bore at the outboard end also receives an end cap which extends across the end of the inboard cup and the end of the spindle to close the entire inboard end of the bearing. The seal and retainer unitize the bearing for shipping and handling. The retainer further keeps grease from migrating into the end cap during the operation of the bearing.

20 Claims, 3 Drawing Sheets

PACKAGE BEARING WITH RETAINER

BACKGROUND OF THE INVENTION

This invention relates in general to antifriction bearings and more particularly to a packaged antifriction bearing having a retainer that generally closes one end of the bearing and unitizes the bearing for shipping and handing.

Several basic arrangements exist by which the road wheels of automotive vehicles are mounted on the suspension systems of such vehicles. All involve a hub and an antifriction bearing that provides two rows of rolling elements capable of taking both radial and thrust loads. Manufacturers prefer to purchase the bearings as packaged units, which include the usual races and rolling elements as well as seals and grease, and to install the package bearings on the hubs to create hub assemblies which are in turn installed on the suspension systems of the vehicles—ultimately to provide a mounting for the road wheels.

One assembly that sees widespread use on the driven wheels of automobiles and light trucks, and lately on the non-driven wheels as well, has a flanged hub provided with a spindle or stub axle which projects into an antifriction bearing. The inner races of the bearing fit over the spindle, while the outer race has lugs that are bolted against the suspension system of the vehicle. Rolling elements are arranged in two rows between raceways on the inner and outer races, so that the hub will rotate with minimum friction. The raceways are oriented such that the bearing transfers both radial and thrust loads. The road wheel is bolted to the flange of the hub. Often the rolling elements take the form of tapered rollers, since they have the capacity to transfer heavy radial loads as well as thrust loads.

In an arrangement of the type stated the bearing at its outboard end, that is the end adjacent to the flange on the hub, has a seal between the inner and outer races to exclude contaminants from the interior of the bearing and to retain a lubricant in that interior. Some also have a seal between the inner and outer races at the inboard end of the bearing. But seals, to be effective, create friction and increase the torque required to rotate the hub. To reduce this torque, some assemblies for non-driven wheels omit the inboard seal and rely on a stamped metal end cap over the inboard end of the bearing. Not only does the end cap isolate the space between the inner and outer races and thereby keep contaminants out of the bearing interior, but it also extends across the end of the spindle and isolates it as well. Indeed, the cap creates a cavity at the end of the spindle, and grease from the interior of the bearing tends to accumulate in this cavity where it does little good.

Apart from that, the absence of a seal at the inboard end of the bearing leaves the inboard cone free to fall out of the bearing. This demands greater care in handling and transporting the package bearing prior to installation on a wheel hub. Moreover, during handling and shipping contaminants may enter the bearing from the exposed space between the inner and outer races at the inboard end of the bearing.

The present invention resides in an antifriction bearing that is for all intents and purposes sealed and unitized for handling and shipping. Yet the bearing imparts the drag of only a single seal. While it accommodates an end cover to close its inboard end during actual operation, the bearing lubricant does not accumulate in the end cover, but is confined by the retainer. The retainer remains with the bearing during the operation of the bearing and is not discarded so it does not present a disposal problem. The invention further resides in an assembly including the package bearing, a spindle over which it is installed, and the end cap fitted to the end of the bearing. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur.

DETAILED DESCRIPTION OF THE INVENTION

Figure 1:
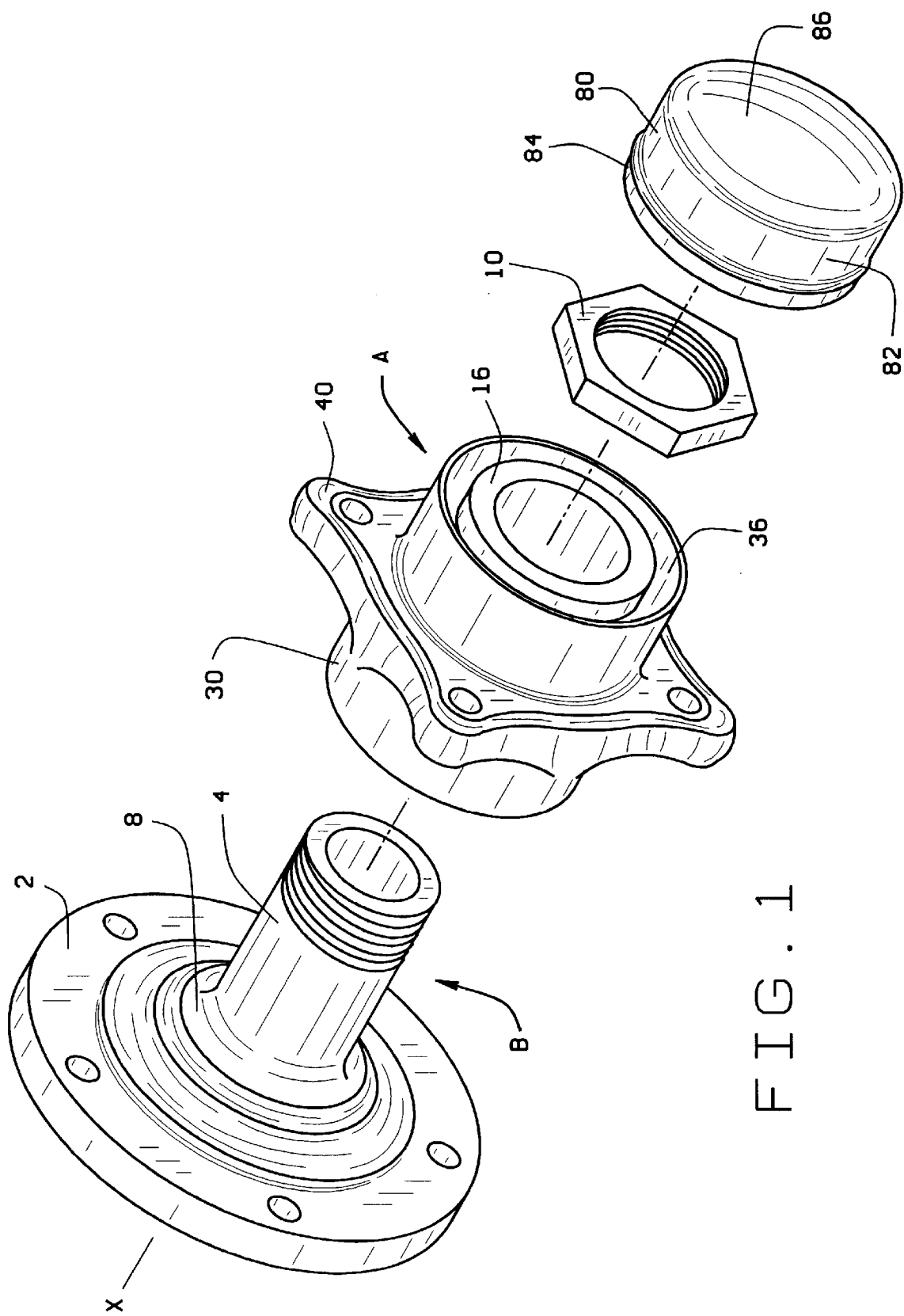
FIG. 1 is an exploded perspective view of a hub assembly including the package bearing of the present invention, a hub to which it fits, and an end cap which fits into the end of the bearing.
Figure 2:
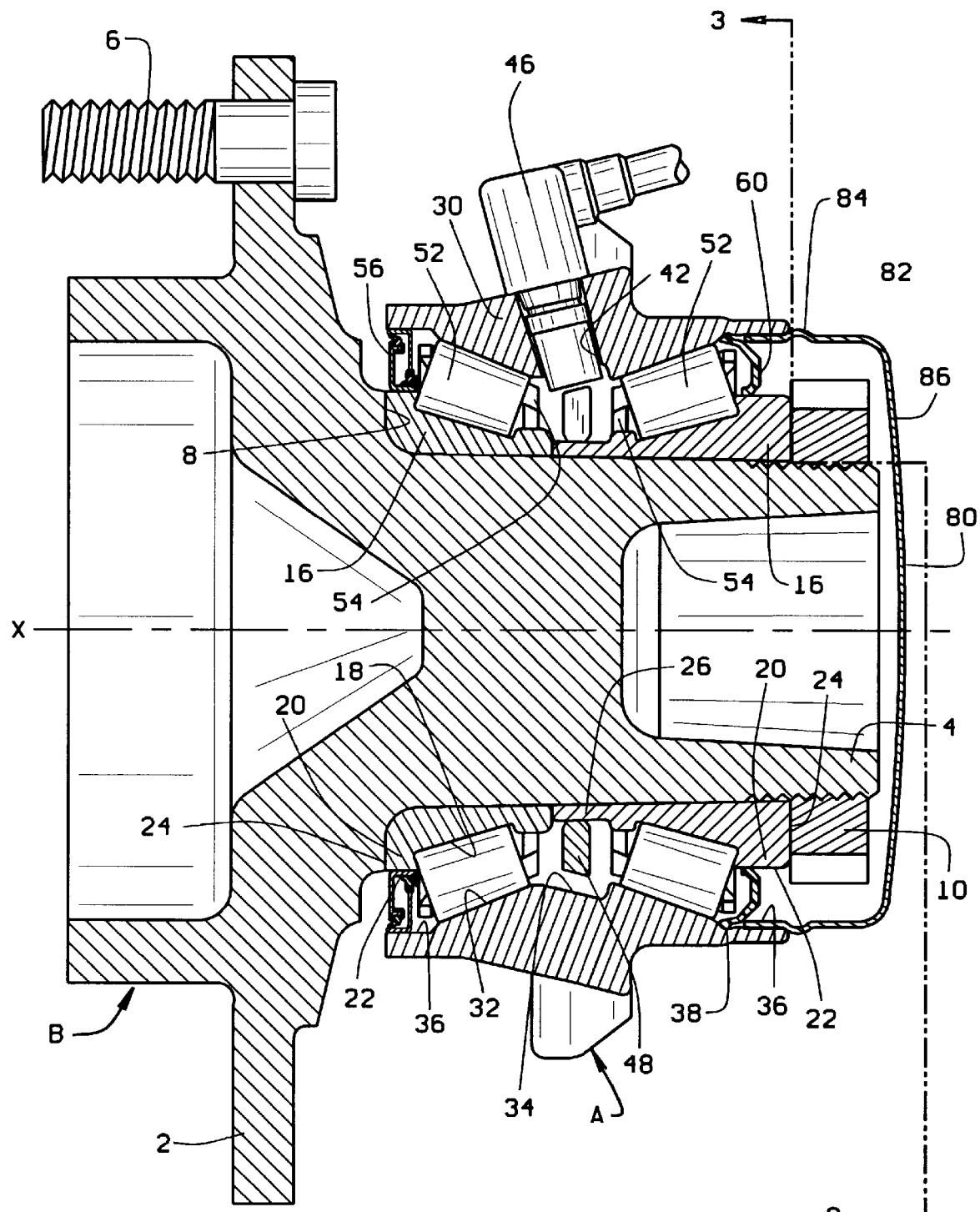
FIG. 2 is a longitudinal sectional view of a package bearing fitted to the hub and in turn provided with an end cap, all in accordance with embodying the present invention.
Figure 3:
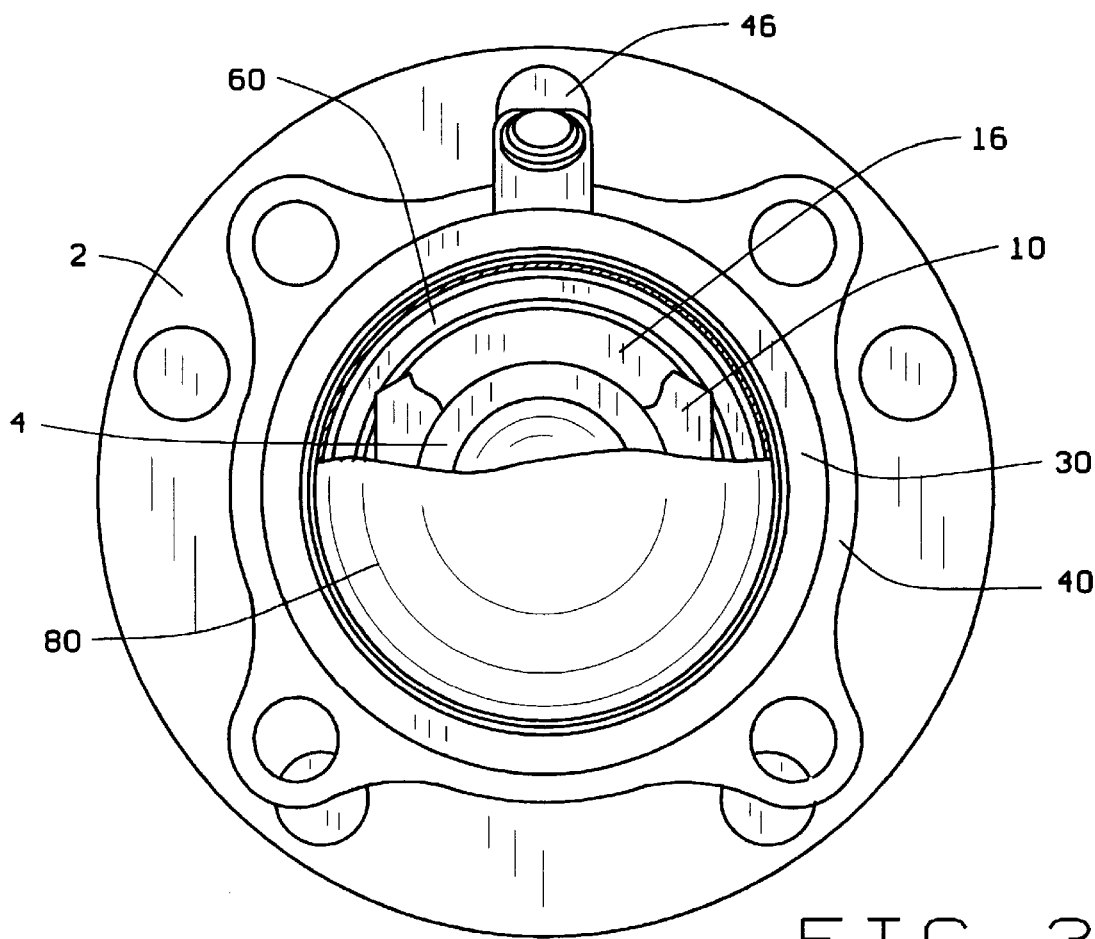
FIG. 3 is an end view of the bearing and hub, partially broken away and in section, taken along line 3—3 of FIG. 2.

Referring now to the drawings, a package bearing A (FIGS. 1 and 2) mounts a road wheel on the suspension system of vehicle, enabling the wheel to rotate relative to the suspension system about an axis X with minimal friction. The bearing A transfers both radial and thrust loads between the wheel and the suspension system. While the bearing A itself is attached directly to the suspension system, it is coupled to the road wheel through a hub B which fits into it. The bearing A and hub B together constitute a hub assembly and are furnished as such to manufacturers of automotive vehicles.

Considering the hub B first, it has (FIGS. 1 and 2) a flange 2 and a stub axle or spindle 4 projecting from it into the bearing A. The flange 2 lies beyond the outboard end of the bearing A and is fitted with lug bolts 6 over which lug nuts thread to secure a road wheel to the flange 2. Actually, the spindle 4 projects from a shoulder 8 at the base of the flange 2. At its opposite end the spindle 4 is provided with threads which a retaining nut 10 engages to retain the bearing A on the hub B. The spindle 4 is hollow at its threaded end, but otherwise is solid so that contaminants cannot pass through it.

The bearing A includes (FIG. 2) a segmented inner race in the form of two cones 16 which fit around the spindle 4 of the hub B where they are captured between the shoulder 8 and the nut 10, there being an interference fit between each cone 16 and the spindle 4. Each cone 16 has a tapered raceway 18 that is presented outwardly away from the axis X and a thrust rib 20 at the large end of its raceway 18. The thrust rib 20 has a cylindrical outer surface 22 which leads out to a back face 24 that is squared off with respect to the axis X. The inboard cone 16 is somewhat longer than the outboard cone 16 by reason of a cylindrical cone extension 26 which projects beyond the small end of its raceway 18. The inboard cone 16 at its cone extension 26 abuts the small end of the outboard cone 16 along the spindle 4, that is to say, the two cones 16 abut at their front faces. The back face 24 of the outboard cone 16 abuts the shoulder 8 that lies at the base of the flange 2. The retaining nut 10 is turned down against the back face 24 of the inboard cone 16 with enough torque to provide a positive clamping force on the two cones 16. Thus, the two cones 16 are captured on the spindle 14 between the shoulder 8 and the nut 10. The two cones 16 abut at their opposite ends, that is at their front faces, so that the extension 26 lies between the raceways 18 of the two cones 16.

Figure 4:
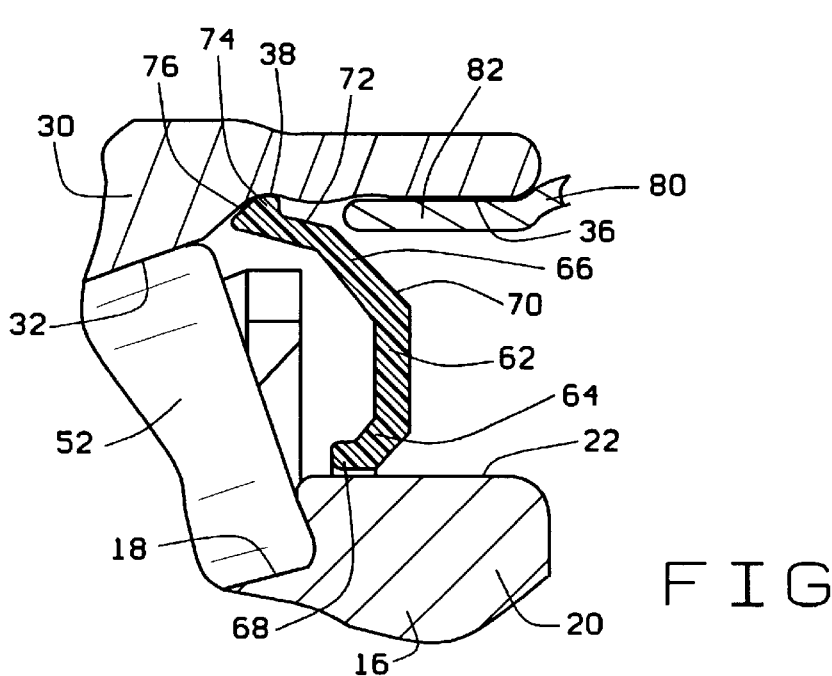
FIG. 4 is an enlarged fragmentary sectional view of the end of the bearing where the retainer is located.

In addition to the two cones 26, the bearing A includes (FIG. 2) a unitary outer race in the form of a double cup 30 which has tapered raceways 32 that are presented inwardly toward the axis X and toward the raceways 18 on the two cones 16. The cup 30 may be considered a housing in that it essentially encloses the remaining working components of the bearing A. The raceways 32 on the cup 30 taper downwardly toward an intervening surface 34 which separates them. At their large ends, the raceways 32 open into short end bores 36 in which the thrust ribs 18 of the two cones 16 are located, there being an annular space between the surface of each end bore 36 and the cylindrical surface 22 of the cone thrust rib 20 that lies within that end bore 36. Each end bore 36 has an undercut 38 (FIG. 4) near the large end of the raceway 32.

Generally midway between its ends, the cup 30 has a flange 40 (FIG. 1) which fits against a component of a suspension system for a vehicle. Here the cup 30 is secured firmly to the suspension system with bolts that thread into the lobes of the flange 40. Along one of the edges of the flange 40 the cup 30 contains a bore 42 (FIG. 2) which extends inwardly, obliquely to the axis X, and opens into the interior of the cup 30 through the intervening surface 34.

The oblique bore 42 contains a speed sensor 46, the inner end of which is presented toward an excitor ring 48 that fits over the extension 26 at the small end of inboard cone 16. The ring 48 has teeth or other disruptions which cause the sensor 46 to produce a pulsating signal as those disruptions move past the end of the sensor 46, and this of course occurs as the spindle 4 and the cones 16 around it rotate. The frequency of the signal reflects the angular velocity of the spindle 4 and indeed the entire hub B. The speed sensing arrangement is similar to that disclosed in U.S. Pat. No. 5,085,519.

In addition to the two cones 16 and the double cup 30, the bearing A has rolling elements in the form of tapered rollers 52 arranged in two rows between the opposing raceways 18 and 32 of the cones 16 and cup 30, respectively, there being a separate row around each cone 16. The tapered side faces of the rollers 52 bear against the raceways 18 and 32, there being essentially line contact between these side faces and the raceways 18 and 32. Moreover, the rollers 52 are on apex, meaning that the conical envelopes in which their side faces lie have their apexes at a common point along the axis X. At their large ends the rollers 52 of the two rows bear against the thrust ribs 20 on the cones 16, and indeed the thrust ribs 20 prevent the rollers 52 from being expelled from the bearing A.

The rollers 52 of two rows fit within cages 54 which maintain the proper spacing between adjacent rollers 52 in each row. The cages 54 further hold the rollers 52 around the cones 16 when the cones 16 are removed from the cup 30.

The end bore 36 at the outboard end of the double cup 30 contains a seal 56 which establishes a dynamic fluid barrier between the cup 30 and the thrust rib 20 on the outboard cone 16, thus closing the annular space at the outboard end of the bearing A. U.S. Pat. No. 5,022,659, which was granted to The Timken Company on Jun. 11, 1991, shows a dual element seal which is suitable for use as the seal 56. It has a stamped metal case which is pressed into the outboard end bore 36 and a stamped metal shield which is pressed over the cylindrical surface 22 for the thrust rib 20 of the outboard cone 16. It also has elastomeric seal elements between its case and shield.

The end bore 36 at the inboard end of the double cup 30 contains (FIG. 2) an annular retainer 60 which snaps into the undercut 38 at the inner end of that bore and establishes a closure around the thrust rib 20 of the inboard cone 16 to close the annular space between the cup 30 and the cone 16 at the inboard end of the bearing A. The retainer 60 is formed from a material rigid enough to enable the retainer 60 to remain in place in the bearing A throughout the working life of the bearing A, yet flexible enough to enable the retainer 60 to contract and pass through the inboard end bore 36 prior to snapping into the undercut 38. Moreover, the material must remain rigid at normal operating temperatures for the bearing A and must remain stable in the presence of typical bearing lubricants. The retainer 60 may be molded from a polymer, preferably nylon, such as ZYTEL 8018 HS NC-10, which is sold by E.I. du Pont de Nemours and Company of Wilmington, Del.

The retainer 60 has (FIG. 4) an end wall 62 and a pair of oblique walls 64 and 66 into which the end wall 62 merges along its inner and outer margins, respectively. The end wall 62 lies generally perpendicular to the axis X and represents the farthest extension of the retainer beyond the rollers 52 of the outboard row. The two oblique walls 64 and 66 lie oblique to the axis X, and project inwardly and outwardly, respectively, from the end wall 62 as well as axially toward the rollers 52. The inner oblique wall 64 lies inside the end wall 62 and projects toward the thrust rib 20 of the inboard cone 16, terminating at a short axially directed lip 68 which encircles the cylindrical surface 22 on the thrust rib 20. The inside diameter of the axial lip 68, however, slightly exceeds the diameter of the cylindrical surface 22 on the thrust rib 20 so that a radial gap exists between the cylindrical surface 22 and the axial lip 68. The gap should range between about 0.0005 and 0.0105 inches and preferably should be about 0.005 inches. The outer oblique wall 66 projects toward the undercut 38 in the end bore 36 and includes inner and outer segments 70 and 72, with the former being at a steeper angle to the axis X than the latter. Preferably the inner segment 70 is oriented at between 42° and 48° with respect to the axis X, whereas the outer segment 72 lies at about 12° to 18°. In addition, the outer oblique wall 66 has a retaining bead 74 which extends generally radially from the outer segment 72 of the outer wall 66 and forms the periphery of the retainer 60. The retaining bead 74 projects into the undercut 38 of the outboard end bore 36 and secures the retainer 60 in the bore 36. It has a beveled end 76 that is presented away from the end wall 62.

The cross-section of the retainer 60 remains generally uniform through the end wall 62 and the inner oblique wall 64, including the axial lip 68, but it diminishes through the outer oblique wall 66, with the inner segment 70 of the outer oblique wall 66 being generally thicker than the outer segment 72. Thus, the retainer 60 possess its greatest rigidity through its end wall 62 and inner oblique wall 64 and its greatest flexibility through its outer oblique wall 66, particularly in the outer segment 72 of that wall. When the retainer 60 is unrestrained, the diameter of the radially directed retaining bead 74 exceeds the diameter of the end bore 36 and the diameter of the undercut 38 as well. Thus, when installed in the end bore 36, the retainer 60 is deformed, with the two segments 70 and 72 of the outer oblique wall 66 accommodating most of this deformation. In other words, the outer wall 66 is biased outwardly under the natural resiliency of the polymer from which the retainer 60 is molded. The oblique walls 64 and 66 create within the retainer 60 an annular cavity that opens toward the interior of the bearing A and that cavity receives the end of the cage 54 for the rollers 52 of the inboard row.

The retainer 60 is installed in the inboard end bore 36 of the double cup 30 by forcing it axially into and through the bore 36. As the retainer 60 moves into the bore 36, the beveled surface 76 at the leading end of the retaining bead 74 functions as a cam and contracts the bead 74. The outer oblique wall 66 flexes to accommodate this deflection. The contracted bead 74 advances along the surface of the bore 36 until it reaches the undercut 38, whereupon it snaps outwardly into the undercut 38. Even within the undercut 38, the bead 74 remains contracted slightly and likewise the outer oblique wall 66 deflected slightly. This outward bias of the wall 66 insures that the retainer 60 remains in a fixed and determined position, both radially and axially, within the end bore 36.

The inboard end bore 36 of the double cup 30 also receives an end cap 80 which is preferably formed as a metal stamping. The end cap 80 has an axially directed wall 82 which projects into the end bore 36, there being an interference fit between the wall 82 and the surface of the end bore 36 so that the cap 80 is retained in place by friction. The axial wall 82 contains an annular rib 84 which limits the advance of the wall 82 into the bore 36 and thus insures that the cap 80 does not contact and distort the retainer 60. Beyond the rib 84 the wall 82 surrounds the retaining nut 10 on the spindle 4 of the hub B. The axial wall 82 merges into a radial wall 86 which extends over the end of the hub spindle 4, thereby closing the inboard end of the bearing A and isolating the inboard end of the spindle 4 as well.

The bearing A is supplied as a package, that is to say, it comes completely assembled with grease in its interior. The seal 56 at the outboard end of the bearing A prevents the outboard cone 16 and its complement of rollers 52 from falling out of the double cup 30. It also keeps contaminants out of the interior of the bearing A during shipping and handling. The retainer 60 at the inboard end of the bearing A serves the same purpose. It keeps the inboard cone 16 and its complement of rollers 52 in the cup 30 and further prevents contaminants from entering the interior of the bearing A.

The supplier of hub assemblies for automotive vehicles normally will acquire the package bearing A and the hub B from different sources. That supplier forces the cones 16 of bearing A over the spindle 4 of a hub until the back face 24 of the outboard cone 16 abuts the shoulder 8 on the hub B. Of course, the rollers 52 and cup 30, being a part of the package bearing A, follow the cones 16 over the spindle 4. Once the bearing A is installed on the spindle 4, the retaining nut 10 is engaged with the threads at the end of the spindle 4 and run down to a specified torque against the back face 24 of the inboard cone 16. This secures the bearing A on the hub B. The bearing A may also be secured by deforming the end of the spindle outwardly in a rotary forming operation as disclosed in U.K. Patent Application 9713343.3, filed Jun. 24, 1997, by The Timken Company. Finally, the end cap 80 is pressed into the inboard end bore 36 of the double cup 30 to close the inboard end of the bearing A.

In the operation of the bearing A, the hub B rotates within the double cup 30 of the bearing A. The seal 56 at the outboard end of the bearing A keeps the bearing grease from being pumped out of the outboard end of the bearing by the rollers 52 of the outboard row. It also prevents contaminants from entering the bearing A at its outboard end. The end cap 80 at the inboard end of the bearing A likewise excludes contaminants in that it establishes a static fluid barrier over the entire inboard end of the bearing A. The retainer 60, on the other hand, keeps grease that is pumped out the inboard raceways 18 and 32 by the rollers 52 of the inboard row from migrating into the large cavity formed by the end cap 80 where it has little benefit. Instead, the retainer 60 keeps the grease in the region of the inboard rollers 52 and the raceways 18 and 32 as well as at the thrust rib 20 along which the rollers 52 move. But unlike traditional seals, the retainer 60 does not impose any torque or drag on the hub B. The retainer 60 remains securely in place throughout the working life of the bearing A, since its retaining bead 74 is trapped firmly in the undercut 38 at the end of the bore 36. While the polymer of the retainer 60 and the steel of the cup 30 expand and contract at different rates during changes in temperature, the differential thermal expansion is accommodated by the flexibility of the outer oblique wall 66.

This invention is intended to cover all changes and modifications of the example of the invention herein chosen for purposes of the disclosure which do not constitute departures from the spirit and scope of the invention.

What is claimed is:

1. A package bearing for facilitating rotation about an axis, said bearing comprising: a unitary outer race having first and second ends and raceways located between the ends, with the raceways being presented inwardly toward the axis, the outer race having a bore opening out of its second end; an inner race located within the outer race and having a first segment located at the first end of the outer race and a second segment located at the second end of the outer race, all such that annular spaces exist between the inner and outer races at the first and second ends of the outer race, each segment of the inner race having a raceway that is presented outwardly toward one of the raceways of the outer race; rolling elements arranged in two rows between the raceways of the outer and inner races, there being a separate row around each segment of the inner race; a seal fitted to the outer race and closing the space between the inner and outer races at the first end of the outer race and further preventing the first segment of the inner race from moving out of the first end of the outer race; and a retainer fitted into the bore at the second end of the outer race and closing the annular space between the inner and outer races at the second end of the outer race and further preventing the second segment of the inner race from moving out of the second end of the outer race, the retainer being biased outwardly against the outer race at the end bore to retain the retainer in a fixed and determined position in the end bore.

2. A bearing according to claim 1 wherein the bore at the second end of the outer race has an undercut; wherein the retainer is lodged under a bias within the undercut; and wherein the bore extends axially beyond the retainer.

3. A bearing according to claim 2 wherein a slight gap exists between the retainer and the second segment of the inner race.

4. A bearing according to claim 3 wherein the retainer is molded from a polymer.

5. A bearing according to claim 1 wherein the retainer has a wall that lies oblique to the axis, and is deflected inwardly against the natural bias of the material from which the retainer is made.

6. A bearing according to claim 5 wherein the end bore has an undercut and the oblique wall has a bead which projects into the undercut.

7. An assembly comprising: a spindle that surrounds the axis; first and second inner race components located over the spindle, each inner race component having a raceway that is presented outwardly away from the axis and is inclined relative to the axis; a unitary outer race surrounding the inner race components and having first and second raceways that are presented toward the raceways of the first and second inner race components, respectively, the raceways of the outer race likewise being inclined relative to the axis, the outer race further having a bore which opens out of it beyond its second raceway; a seal attached to the outer race beyond its first raceway and establishing a dynamic fluid barrier between the outer race and the first inner race component; a retainer located in the bore of the outer race and establishing a closure with the second inner race component; and an end cap fitted to the outer race to close the end of the outer race beyond its second raceway and extending across the end of the second inner race component and the end of the spindle.

8. An assembly according to claim 7 wherein the outer race has another bore that opens out of it beyond its first raceway; and wherein the seal is in the other bore of the outer race.

9. An assembly according to claim 7 wherein the bore in the outer race contains an undercut which is located between the second raceway and the end cap, and the retainer is lodged in the undercut.

10. An assembly according to claim 9 wherein the retainer has an outer wall that lies oblique to the axis, and has the capacity to flex to enable the retainer to move through the bore and expand into the undercut.

11. An assembly according to claim 10 wherein the retainer has a bead which projects generally radially from the oblique wall and is received in the undercut; and wherein the oblique wall is biased outwardly to retain the bead securely in the undercut.

12. An assembly for facilitating rotation about an axis, said assembly comprising:

(1) a hub having a shoulder; a spindle projecting from the shoulder and surrounding the axis; and a retaining element at the opposite end of the spindle;

(2) a package bearing located on the hub and including first and second cones located around the spindle between the shoulder and the retaining element, each cone having a tapered raceway, the raceways of the first and second cones tapering downwardly toward each other; a unitary double cup having first and second raceways that taper downwardly toward each other and are presented opposite the tapered raceways on the first and second cones, respectively, the cup having first and second end bores opening out of its ends beyond the first and second raceways, respectively; tapered rollers arranged in two rows between the tapered raceways of the cones and cup, there being a separate row around each cone; a seal located in the first end bore and establishing a dynamic fluid barrier with the first cone beyond the raceway of the first cone and the first raceway of the cup; and a retainer located in the second bore and establishing a closure between the cup and the second cone beyond the raceway on the second cone and the second raceway of the cup; and (3) an end cap fitted into the second bore of the cup beyond the retainer and extending across the end of the second cone and the end of the spindle.

13. The assembly of claim 12 in which the retainer has an end wall and an outer wall that is connected to the end wall and lies oblique to the axis, the outer wall extending outwardly from the end wall and being deformed radially inwardly to accommodate the second bore.

14. The assembly according to claim 13 wherein the second bore contains an undercut and the retainer is received in the undercut.

15. The assembly according to claim 14 wherein the retainer on its outer wall has a generally radially directed bead which projects into the undercut.

16. The assembly according to claim 15 wherein the retainer has an inner wall that is connected to end wall and lies oblique to the axis, and the inner wall has an axially directed lip that encircles the second cone.

17. The assembly according to claim 15 wherein the second cone has a thrust rib beyond the large end of its raceway and the retainer encircles the thrust rib.

18. The assembly according to claim 17 wherein a radial gap exists between the retainer and the thrust rib of the second cone.

19. The assembly according to claim 15 wherein the bead has a beveled end face which is presented away from the open end of the second bore and is inclined to contract the outer wall as the retainer enters the second bore.

20. The assembly according to claim 12 wherein the retainer has a wall generally where it engages the surface of the bore, the wall being oblique to the axis and biased outwardly so that the retainer is firmly engaged with the double cup.

* * * * *